(12) United States Patent
Ferlitsch

(10) Patent No.: US 7,973,954 B2
(45) Date of Patent: Jul. 5, 2011

(54) METHOD AND APPARATUS FOR AUTOMATIC LANGUAGE SWITCHING FOR AN IMAGING DEVICE

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1344 days.

(21) Appl. No.: 11/467,659

(22) Filed: Aug. 28, 2006

(65) Prior Publication Data
US 2008/0049243 A1 Feb. 28, 2008

(51) Int. Cl.
*G06F 3/12* (2006.01)
(52) U.S. Cl. ...................... 358/1.15; 358/1.13
(58) Field of Classification Search .............. 358/1.13, 358/1.15; 704/8, 9; 710/14
See application file for complete search history.

(56) References Cited

U.S. PATENT DOCUMENTS

| | | | | |
|---|---|---|---|---|
| 5,165,014 A * | 11/1992 | Vassar | .......................... | 358/1.13 |
| 5,222,200 A | 6/1993 | Callista et al. | | |
| 5,293,466 A * | 3/1994 | Bringmann | ................... | 358/1.15 |
| 5,388,920 A * | 2/1995 | Ohara | .............................. | 400/76 |
| 5,392,419 A * | 2/1995 | Walton | .......................... | 358/1.13 |
| 5,438,650 A * | 8/1995 | Motoyama et al. | .......... | 358/1.15 |
| 5,467,432 A | 11/1995 | Ota | | |
| 5,469,373 A * | 11/1995 | Kashiwazaki et al. | ........ | 702/127 |
| 5,511,149 A * | 4/1996 | Hayano | ........................ | 358/1.13 |
| 5,555,435 A * | 9/1996 | Campbell et al. | ............. | 358/1.13 |
| 5,633,992 A * | 5/1997 | Gyllenskog | .................. | 358/1.15 |
| 5,802,262 A * | 9/1998 | Van De Vanter | ................... | 714/1 |
| 5,828,817 A * | 10/1998 | Landau | ......................... | 358/1.13 |
| 5,854,940 A * | 12/1998 | Niihara et al. | ..................... | 710/5 |
| 5,960,113 A | 9/1999 | Even et al. | | |
| 6,023,760 A * | 2/2000 | Karttunen | ...................... | 712/300 |
| 6,049,869 A * | 4/2000 | Pickhardt et al. | ............. | 712/300 |
| 6,097,498 A * | 8/2000 | Debry et al. | .................. | 358/1.13 |
| 6,292,772 B1 * | 9/2001 | Kantrowitz | ........................ | 704/9 |
| 6,396,951 B1 | 5/2002 | Grefenstette | | |
| 6,400,287 B1 * | 6/2002 | Ehrman | ......................... | 341/55 |
| 6,525,831 B1 * | 2/2003 | Evans, IV | ..................... | 358/1.15 |
| 6,603,565 B1 * | 8/2003 | Scheidig et al. | ............. | 358/1.13 |
| 2002/0140958 A1 | 10/2002 | Lester | | |
| 2003/0187633 A1 * | 10/2003 | Fairweather | ...................... | 704/9 |

(Continued)

FOREIGN PATENT DOCUMENTS

JP          62179083          8/1987

(Continued)

OTHER PUBLICATIONS

Patent Abstracts of Japan; English translation of 5-096823; Fuji Xerox Co. Ltd; 2 Pages.

(Continued)

*Primary Examiner* — King Y Poon
*Assistant Examiner* — Vincent R Peren
(74) *Attorney, Agent, or Firm* — Marger Johnson & McCollom PC

(57) ABSTRACT

Recognizing a language format of an input data stream including reading a next data sample of the input data stream in a current state, selecting a next state in response to the next data sample, transitioning to the next state and repeatedly reading the next data sample and selecting the next state until the next state is an end state, and identifying the language format in response to the current state when the next state is an end state.

11 Claims, 9 Drawing Sheets

U.S. PATENT DOCUMENTS

| | | | |
|---|---|---|---|
| 2003/0221013 A1* | 11/2003 | Lockwood et al. | 709/231 |
| 2004/0260536 A1* | 12/2004 | Hwang | 704/9 |
| 2005/0068559 A1 | 3/2005 | Ferlitsch | |
| 2005/0068574 A1 | 3/2005 | Ferlitsch | |
| 2005/0132342 A1* | 6/2005 | Van Lunteren | 717/143 |
| 2006/0229865 A1* | 10/2006 | Carlgren et al. | 704/8 |
| 2008/0046423 A1* | 2/2008 | Khan Alicherry et al. | 707/6 |

FOREIGN PATENT DOCUMENTS

| | | |
|---|---|---|
| JP | 05096823 | 4/1993 |
| JP | 05131726 | 5/1993 |
| JP | 05177884 | 7/1993 |
| JP | 07084738 | 3/1995 |
| JP | 08123636 | 5/1996 |
| JP | 08290636 | 11/1996 |
| JP | 10091368 | 4/1998 |
| JP | 2004050645 | 2/2004 |
| JP | 2006048649 | 2/2006 |

OTHER PUBLICATIONS

Patent Abstracts of Japan; English translation of 08-290636; Fuji Xerox Co. Ltd.; 2 Pages.
English Language Abstract of Japan Publication No. JP10091368.
English Language Abstract of Japanese Publication No. 2006048649.
English Language Abstract of Japanese Publication No. 2004050645.
English Language Abstract of Japanese Publication No. 05131726.
English Language Abstract of Japanese Publication No. 05177884.
English Language Abstract of Japanese Publication No. 08123636.
English Language Abstract of Japanese Publication No. 07084738.
English Language Abstract of Japanese Publication No. 62179083.
English Language Abstract of Japanese Publication No. 10091368.
English Language Abstract of Japanese Publication No. 08290636.
English Language Abstract of Japanese Publication No. 05096823.

* cited by examiner

FIG. 2
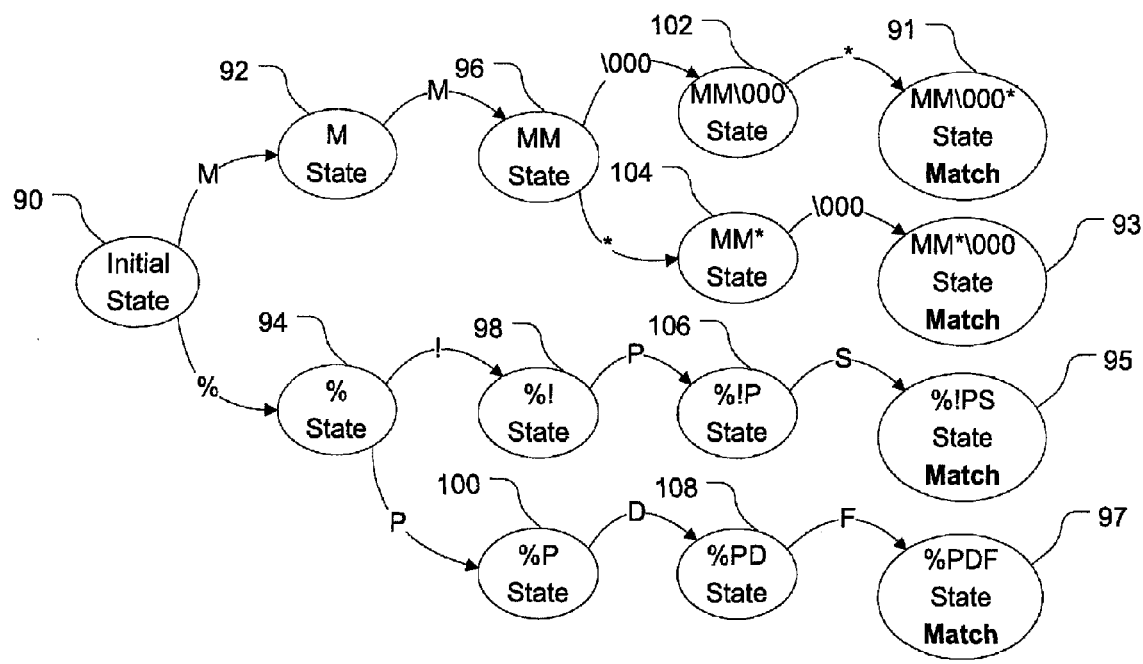
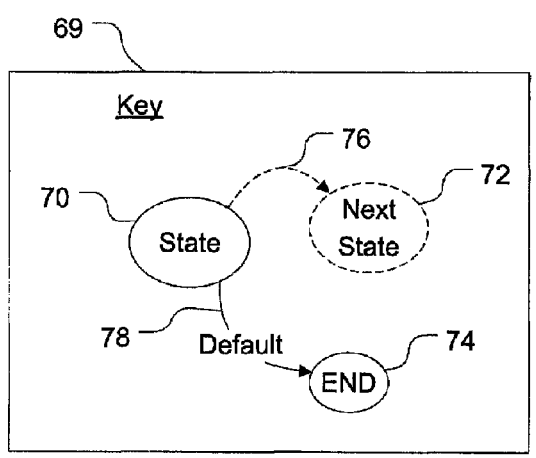

METHOD AND APPARATUS FOR AUTOMATIC LANGUAGE SWITCHING FOR AN IMAGING DEVICE

BACKGROUND

This disclosure relates to imaging devices, in particular, to automatic language switching in imaging devices.

Some imaging devices may only support a single language format. For example a printer may only support a raster data format that is specific to the printer's printing engine. In such a device, the imaging data is sent without prior checking to the print data interpreter. If the input is in the correct language format, the input is recognized and the job is output; otherwise, some or all of the input is not recognized and the job is not output, or outputted incorrectly.

Other imaging devices may support multiple language formats. However, an explicit language switch that precedes the imaging data may be required. A command or other data may be received by the imaging device that includes a known or predetermined format specifying the language format of the subsequent imaging data. For example, many imaging devices support explicit language switching by supporting Hewlett Packard's printer job language (PJL) command @PJL ENTER LANGUAGE=<language>. If the specified language is supported by the device, the imaging data is then processed by the corresponding interpreter; otherwise, the input is rejected and the job is not output.

Unfortunately, generators of imaging data that do not use an explicit language switch may not be compatible with imaging devices that require explicit language switching.

Alternatively, when an imaging device receives the imaging data without an explicit indication of the language format, the imaging device must sample the imaging data to determine the language format. This process is commonly referred to as automatic language switching.

In one method of automatic language switching, an initial byte sample of the input stream of the imaging data is pre-read and passed to a language recognition process. For each supported language, there is a language specific recognition test, such as looking for a special signature in the byte sample. The method applies each language specific recognition test in a predetermined sequential order until one test acknowledges recognition of the language format. (If none do, an error is generated.) When the language is recognized, the input stream is then processed by the corresponding language interpreter.

Unfortunately, with each set of imaging data, the recognition tests are performed in the same order. Thus, for a given language format with a recognition test at the end of the list, every preceding recognition test must be performed each time imaging data in that language format is received, wasting time and resources.

In another method, an initial byte sample of the imaging data is pre-read and compared against a group of language recognizers with one language recognizer per supported language. Each language recognizer generates a probability that the language of the imaging data is the associated language format. The language format with the highest probability is used.

Unfortunately, by using probabilities to select a language, the result is only a guess of the correct language, not a specific determination, and may be an incorrect selection. Furthermore, the test for each language must be performed to determine its associated probability.

In another method, an initial byte sample of the input stream is pre-read and passed to a language recognition process. The language recognition process uses a dynamically determined sequential order of language recognizers. The order of language recognizers is updated in response to how often the associated language format is found.

Unfortunately, each language recognizer reapplies its entire signature test. Thus, even if two language formats have identical initial portions of their respective signatures, a test for the identical portion may be performed multiple times.

Accordingly, there remains a need for an improved method and apparatus for determining a language format of data.

SUMMARY

An embodiment recognizes a language format of an input data stream by reading a next data sample of the input data stream in a current state, selecting a next state in response to the next data sample, transitioning to the next state and repeatedly reading the next data sample and selecting the next state until the next state is an end state, and identifying the language format in response to the current state when the next state is an end state Another embodiment recognizes a language format of an input data stream by reading a data sample of the input data stream, updating a set of potential language formats in response to the data sample, repeating the reading and updating until one or zero potential language formats remain in the set, and if one potential language format remains in the set: verifying that a language format signature for the remaining potential language format exists in the input data stream, and identifying the language format in response to the verification.

BRIEF DESCRIPTION OF THE DRAWINGS

FIG. 2 is a state diagram illustrating how a language format of an input data stream is recognized according to another embodiment.

DETAILED DESCRIPTION

Embodiments identify a language format using data samples from an input data stream. As used in this discussion, an input data stream includes any data in any medium that is accessible. For example, an input data stream may be data read from a file on a hard disk device or removable storage, data stored in a memory, data received through a network or local interface, or the like.

A data sample is a portion of an input data stream. The data sample may have any size as desired. In one example, the size of the next data sample may be one byte. Alternatively, the size may be the size that a processor implementing the method is capable of using in a single comparison. For example, a processor may make a comparison between two four-byte data samples using one machine instruction. Thus, the data sample may have a size of four bytes. Furthermore, the size of the data sample may be selected and varied as desired.

A language format is a particular format of organization or representation of data. A language format may be identified by a language format signature. Such a language format signature may be a sequence of data samples that identifies an associated language format from among other language formats.

A language signature fragment is a representation of a portion of a language format signature. For example, the language format signature of "% PDF" identifies the Portable Document Format (PDF). Any portion of the signature may be a language fragment. Thus, "%" and "P" characters may be language signature fragments. In addition, larger portions, such as "DF", may be language signature fragments. Furthermore, any combination of portions of a language signature may form a language signature fragment.

Figure 1:
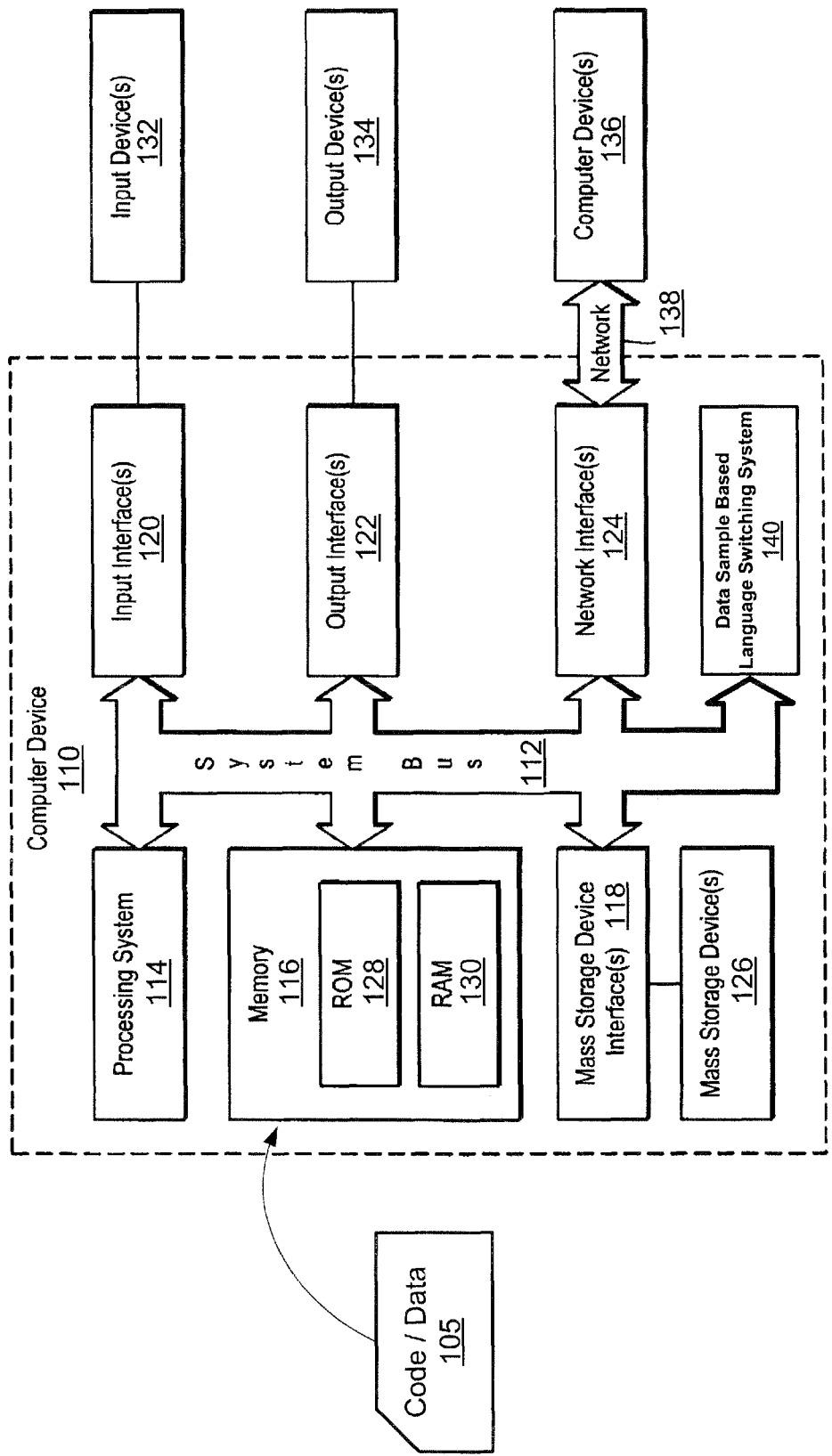
FIG. 1 is a block diagram showing a system for automatic language switching according to an embodiment.

FIG. 1 is a block diagram showing a system for automatic language switching according to an embodiment. The system includes a computer device 110. The computer device 110 includes a data sample based language switching system 140.

In addition, the computer device 110 includes system bus 112, which may be configured to connect various components and enable data to be exchanged between two or more components. Through the system bus 112, the language switching system 140 may receive data samples in order to identify a language format of an input data stream. The system bus 112 may include one or more of a variety of bus structures including a memory bus or memory controller, a peripheral bus, or a local bus that uses any of a variety of bus architectures. Additional components that may be connected by system bus 112 include processing system 114 and memory 116. Other components may include one or more mass storage device interfaces 118, input interfaces 120, output interfaces 122, and/or network interfaces 124, each of which will be discussed below. Furthermore, each component may be coupled to one or more of the varieties of bus structures of the system bus 112; however, each component may, but need not be coupled to every variety of bus structure of the system bus 112.

The processing system 114 includes one or more processors. For example, the processing system 114 may include a central processor and optionally one or more other processors designed to perform a particular function or task. The language switching system 140 may be implemented with the processing system 114. Alternatively, the language switching system 140 may be independent of the processing system 114.

Typically, the processing system 114 executes the instructions such as code or data 105 provided on computer readable media, such as on memory 116, a mass storage device 126, such as a magnetic hard disk, a removable magnetic disk, a magnetic cassette, an optical disk, or from a communication connection, such as the network interface 124, which may also be viewed as a computer readable medium.

Memory 116 includes one or more computer readable media. The memory 116 may include or be configured to include code or data 105 for the language switching system 140. In addition, such code and data 105 may be accessed by processing system 114 through system bus 112. Memory 116 may include, for example, ROM 128, used to permanently store information, and/or RAM 130, used to temporarily store information. ROM 128 may include a basic input/output system ("BIOS") having one or more routines that are used to establish communication, such as during start-up of computer device 110. RAM 130 may include one or more program modules, such as one or more operating systems, application programs, and/or program data.

One or more mass storage device interfaces 118 may be used to connect one or more mass storage devices 126 to system bus 112. Such mass storage devices 126 may contain the data stream to be sampled by the language switching system 140. The mass storage devices 126 may be incorporated into or may be peripheral to computer device 110 and allow computer device 110 to retain large amounts of data. Optionally, one or more of the mass storage devices 126 may be removable from computer device 110. Examples of mass storage devices include hard disk drives, magnetic disk drives, tape drives and optical disk drives. A mass storage device 126 may read from and/or write to a magnetic hard disk, a removable magnetic disk, a magnetic cassette, an optical disk, or another computer readable medium. Mass storage devices 126 and their corresponding computer readable media provide nonvolatile storage of data and/or executable instructions that may include one or more program modules such as an operating system, one or more application programs, other program modules, or program data.

The language switching system 140 may receive the data stream through a variety of interfaces. Such interfaces include the input interfaces 120, the output interfaces 122, and the network interfaces 124.

One or more input interfaces 120 may be employed to enable a user to enter data and/or instructions to computer device 110 through one or more corresponding input devices 132. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 120 that may be used to connect the input devices 132 to the system bus 112 include a serial port, a parallel port, a game port, a universal serial bus ("USB"), a firewire port (IEEE 1394), or the like.

One or more output interfaces 122 may be employed to connect one or more corresponding output devices 134 to system bus 112. Examples of output devices include a monitor or display screen, a speaker, a printer, and the like. A particular output device 134 may be integrated with or peripheral to computer device 110. Examples of output interfaces include a video adapter, an audio adapter, a parallel port, a USB, a firewire port, or the like.

One or more network interfaces 124 enable computer device 110 to exchange information with one or more other local or remote computer devices, illustrated as computer devices 136, via a network 138 that may include hardwired and/or wireless links. Examples of network interfaces include a network adapter for connection to a local area network ("LAN") or a modem, wireless link, or other adapter for connection to a wide area network ("WAN"), such as the Internet. The network interface 124 may be incorporated with or peripheral to computer device 110. In a networked system, accessible program modules or portions thereof may be stored in a remote memory storage device. Furthermore, in a networked system computer device 110 may participate in a distributed computing environment, where functions or tasks are performed by a plurality of networked computer devices. In addition, the network interfaces 124 may allow connection to additional input devices 123 and/or output devices 134 that may communicate through a network interface 124. Such additional input devices 123 and/or output devices 134 may be integrated with or peripheral to the computer device 110.

FIG. 2 is a state diagram illustrating how a language format of an input data stream is recognized according to an embodiment. Table 1 lists examples of byte sequences that correspond to language formats. Table 2 is a list of byte sequences that are used in the state diagram of FIG. 2. Where a "\" is followed by three numbers, the three numbers are an octal representation of a byte. Note that one of the TIFF byte sequences of Table 2 has been modified from II*<NUL> to MM*<NUL> for illustration purposes.

TABLE 1

Byte Sequences Identifying Language Formats

| Language | Byte Sequence |
|---|---|
| PJL | @PJL |
| Postscript | %!PS |
| PDF | %PDF |
| PCL | <Esc>E |
| PCL XL | ) HP-PCL XL; |
| TIFF | II*<NUL> or MM<NUL>* |
| JPEG | \377\330 |
| JP2K | \377\117 |
| PNG | \211PNG |

TABLE 2

Sample Byte Sequences for Illustration

| Language | Byte Sequence |
|---|---|
| Postscript | %!PS |
| PDF | %PDF |
| TIFF | MM*<NUL> or MM<NUL>* |

The key 69 of FIG. 2 illustrates attributes of most states. A state 70 has next state transitions 76 and a default transition 78 defined for it. The next state transition 76 illustrates a match of a data sample with potential language formats associated with the state. There may be multiple next state transitions 76. In addition, such a next state transition 76 need not be present. If such a next state transition 76 is present, and there is a match with the data sample and the language signature fragment associated with the next state transition 76, the next state 72 may be selected to be the next state.

Each state 70 has a default transition 78. Even if the state 70 has no next state transitions 76, the state 70 will have a default transition 78. The default transition 78 transitions to an end state 74. For clarity, the states in FIG. 2 do not have the respective default transitions 78 and end states 74 illustrated.

As can be seen in the state diagram of FIG. 2, a next state transition 76 is associated with a language signature fragment. For example, the language signature fragments associated with next state transitions 76 from the "%" state 94 include a language signature fragment of "!" and a language signature fragment of "P". Although such language signature fragments may be represented by a single byte, other sizes or encodings may be used. For example, a Unicode Transformation Format (UTF) encoded characters may include multiple bytes for a single character.

Figure 3:
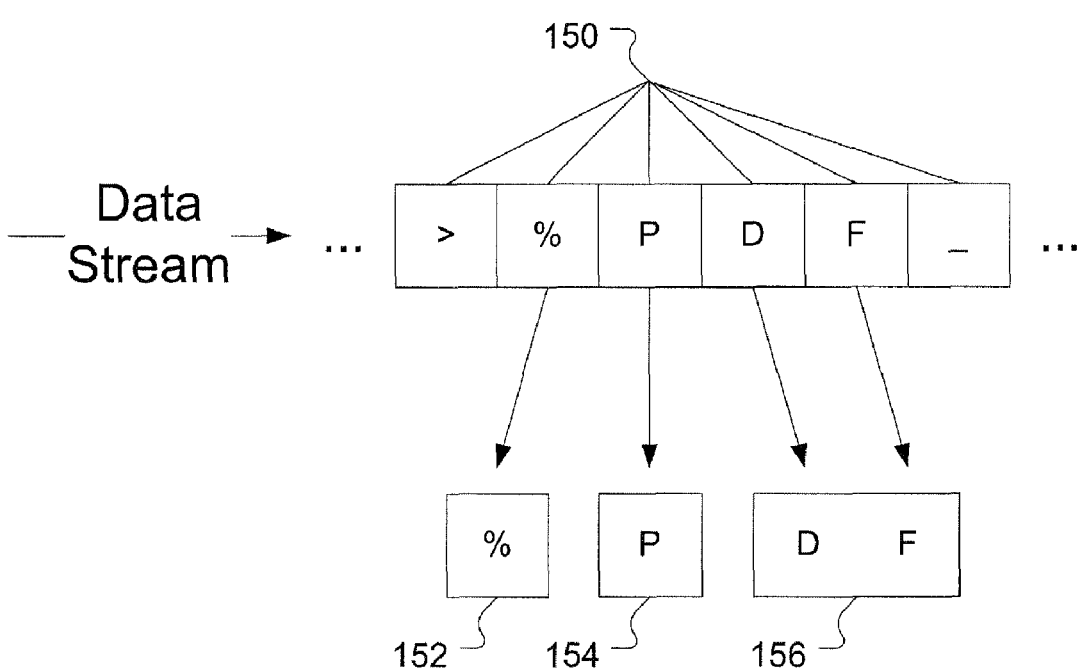
FIG. 3 is a diagram showing an input data stream and language signature fragments.

FIG. 3 is a diagram showing an input data stream and language signature fragments. Bytes 150 are bytes of the input data stream. In this example, the bytes 150 are in a sequential order. Language signature fragments 152, 154, and 156 are part of the input data stream. As described above, a language signature fragment may have a variety of sizes. In this example, language signature fragments 152 and 154 each have a size of one byte. In contrast, language signature fragment 156 has a size of two bytes.

The states may be represented in a variety of ways. In one example, an array of 256 pointers may be maintained with one pointer for each possible value of a byte. Each value in the array may be a pointer to a list of possible next states of matching language formats. Thus, the byte is used as an index to the array to determine the next state.

In another example, a state may include an enumerator of a list of byte values. Each byte value has an associated pointer to a list of possible next states. In addition each byte value may be associated with a matching language format. With such a state, each possible byte may, but need not be included in the list. For example, only byte values associated with matching language formats or additional states may be included in the list.

Furthermore, one state format need not be used for every available state. For example, an initial state may be in the format of an array with an element for each possible data sample. The first data sample may be compared against bytes in the list. If there are none, then the language format is non-determinative. Subsequent states may be represented by a list of byte values associated with matching language formats and potential next states. Data samples are compared with the list of bytes to determine if there is a next state.

Figure 4:
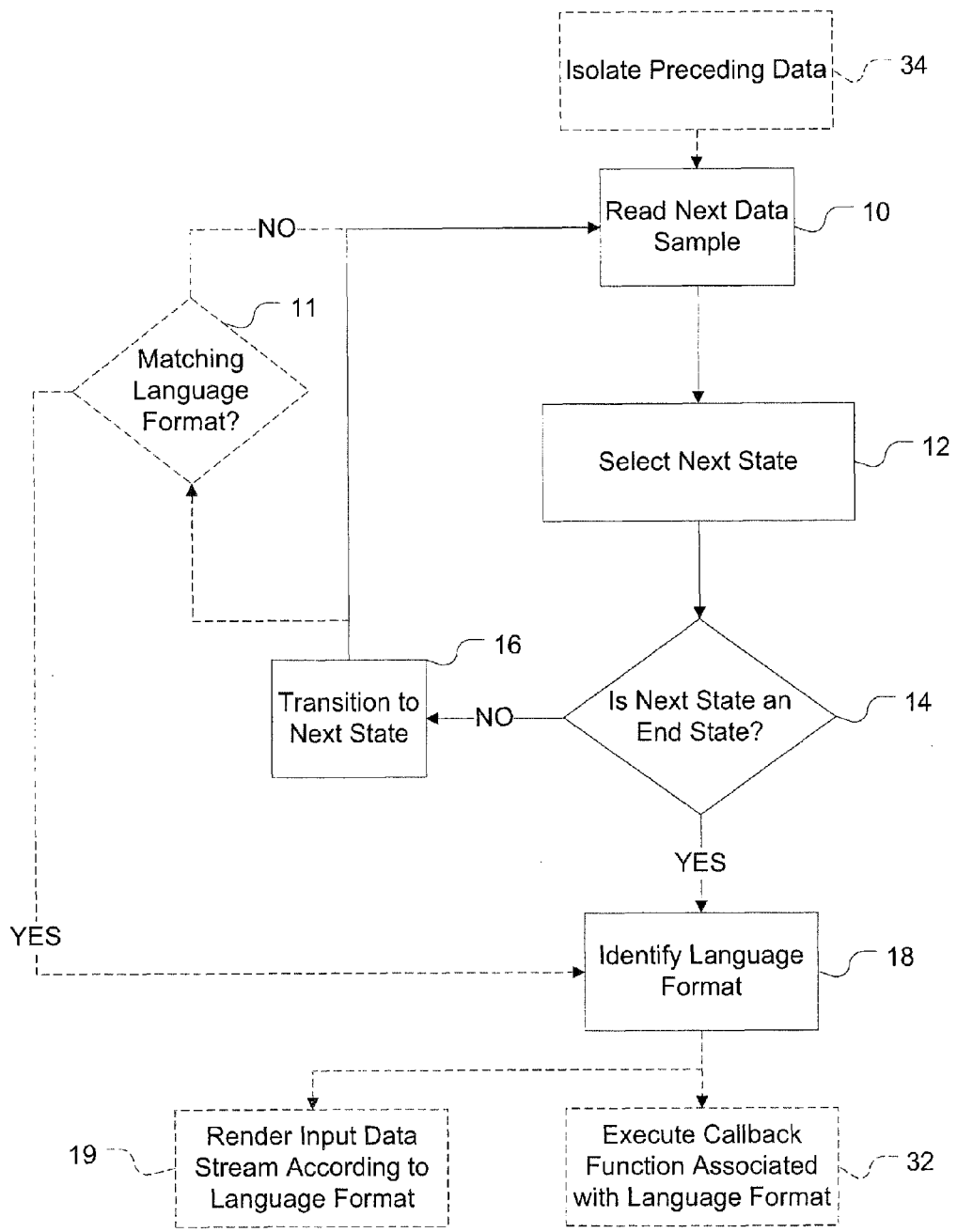
FIG. 4 is a flowchart showing how a language format of an input data stream is recognized according to an embodiment.

FIG. 4 is a flowchart showing how a language format of an input data stream is recognized according to an embodiment. Referring to FIGS. 2 and 4, a current state begins in the Initial State 90. A next data sample of the input data stream is read in 10. A next state is selected in 12 in response to the next data sample.

Using the state diagram of FIG. 2, an example of the selection of a next state in 12 will be illustrated. From the initial state 90, a data sample is compared with the state transitions of that state. For the initial state 90, there are two transitions corresponding to language signature fragments "M" and "%". For example, if the language signature fragment "M" matches the data sample, the next state is the "M" state 92. Similarly, if the language signature fragment "%" matches the data sample, the next state is the "%" state 94. If the data sample does not match either the "M" or the "%" language signature fragments, the next state is the end state.

If the next state is not an end state in 14, the current state transitions to the next state in 16 as indicated by the data sample. Alternatively, if the next state is the end state, the language format is identified in 18.

As described above, the size of the data sample may be selected as desired. Furthermore, the data sample may be of a fixed size or a varying size. In one example, the selection of the data sample is made to minimize possible state transitions. Referring to FIG. 2, a one byte data sample size may be used during the transitions from the "%" state 94 to either the "% !" state 98 or the "% P" state 100. However, both the "% !" state 98 and the "% P" state 100 include two sequential transitions to reach a state including a matching language format. Thus, for the transitions from either state, the data sample size read in 10 may be changed to two bytes and be compared to a corresponding two byte language signature fragment. For example, if the current state is the "% P" state 100, a two byte next data sample may be compared with the two byte language signature fragment of "DF". As a result, only one transition to the "% PDF" state 95 is made, where two state transitions would have been made had a one byte data sample been used.

In one example of identifying the language format in 18, the language format is identified based on the current state before the end state. If a state having a match is the current state, then the language format associated with the match is determined to be the language format. For example, consider the input data stream having the sequence "% PDF". The state transitions would eventually result in the current state being the "% PDF" state 97, with a match to the PDF language format. Since that state has no transitions other than the end state, the match to the PDF language format associated with that state is used as the language format.

Alternatively, consider the input data stream having the sequence "% PDX". Thus, the state transitions would lead to the "% PD" state 108. However, the data sample of "X" would not match a language signature fragment associated with a transition out of the "% PD" state. Thus, the end state would be the next state. The "% PD" state 108 does not have a matching language format. As a result, the language format is identified as non-deterministic in 18.

Thus, using an embodiment described above, a first byte is compared with the first bytes of the known language format signatures. Subsequent bytes are compared with corresponding bytes of known language signatures that have matched the prior bytes. If at any point, there is no match with a current byte, there is either a language format identified or the language format is non-deterministic.

Although in FIG. 2 only states with no further transitions are illustrated as having matches, a particular state may include both a matching language format and transitions to other states for additional matching language formats. However, the matching language format may be identified as the language format even if there may be more potential matches. Accordingly, even though additional transitions may be possible, the next state is indicated as the end state. Since there is a match associated with the current state, the matching language format is identified as the language format.

A next data sample may be an initial sample if no data samples have been read. Furthermore, a next data sample may include an inherent sequence. For example, the next data sample may be the next byte of the input data stream, selected in a sequential order. However, the next data sample need not be the next sequential data sample.

The reading of the next data sample in 10 may be implemented in a variety of ways. For example, reading may include access to a buffer storing a portion of the input data stream. Alternatively, reading may be a process requesting data from a pre-read process reading the input data stream. As described above, the next data sample may have any size as desired. In addition, the size of the next data sample may be different from reading to reading. Furthermore, although a desired data sample size may be a byte, word, or other common size, the data read from the input stream may be in a larger block as desired. For example, it may be more efficient to read data from the input stream in 512 byte blocks. Readings of the data sample in 10 may be made from a buffer storing the 512 byte block.

A pre-reading process may initiate the method for determining the language format. Specifically, the pre-reading process may initiate the reading of the data samples. Alternatively, the reading of the data samples may be a currently running process that requests data from a pre-read process. As additional data samples are read, requests may be made to the pre-reading process for additional data following the most recently read data sample.

In another embodiment, after transitioning to the next state in 16, it is determined if the current state indicates a matching language format in 11. If there is a matching language format, the matching language format is identified as the language format in 18. Thus, a matching language format may be found, yet the current state may indicate that there are additional possible matches through additional potential next states. That matching language format is identified as the language format in 18.

Operation 11 in FIG. 3 is illustrated using dashed lines. Such dashed lines, and similar dashed lines used in other figures represent optional operations that may be included in various other embodiments or combinations of embodiments.

Alternatively, even if there is a matching language format, a next data sample may be read to compare to next possible states. As the state machine progresses, further data samples may be read. However, another matching language format may not be found. In such a case, the additional data samples that were read after the first matching language format was found may in fact be part of the data formatted in the first matching language format. Thus, the additional data samples read to determine if there were any other matching language formats may be pushed back to be processed with the rest of the data associated with the language format. As a result, those data samples would be available for interpretation of the data in the matching language format.

Figure 5:
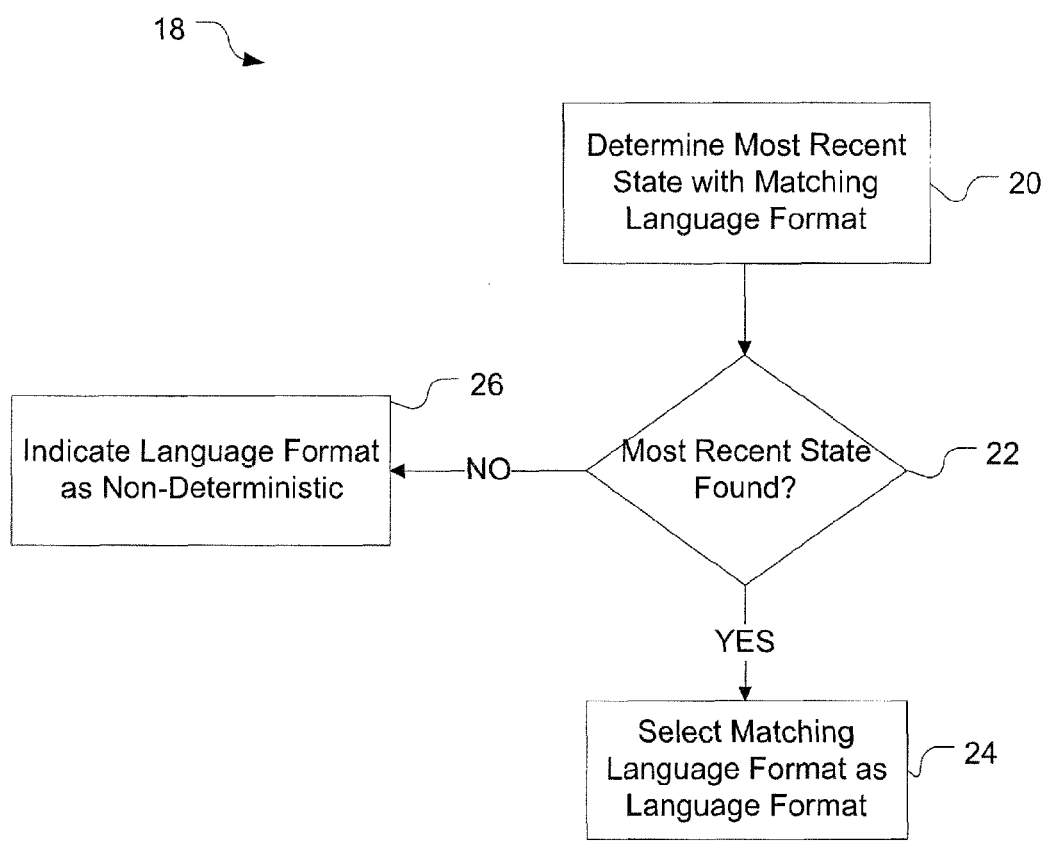
FIG. 5 is a flowchart showing how a language format is identified in FIG. 4.

FIG. 5 is a flowchart showing how a language format is identified in FIG. 4. In 20, a most recent state is determined. The most recent state is selected from among the current state and previous states that include a matching language format. As described above, the current state may have a corresponding language format match. If so, the current state would be determined as the most recent state. Thus, in 22, the matching language format of the current state would be selected as the language format.

Alternatively, previous states may be examined to determine if there was a previous matching language format. For example, consider two language formats with one having a signature that is equivalent to a first portion of the signature of the second format. A match will be made when the state machine detects the signature of the first language format. However, because the second language format signature includes the entire first language format signature, such a match is still not determinative. Thus, a tentative match is indicated and the state machine proceeds to attempt to match the second language format signature.

If a match is made with the second language format, then that language format may be selected. However, if a match is not made, then the state machine returns to the most recent state where there was a match, in this case, the match with the first language format signature. Since that state is the most recent state with a match, that matching language format is selected as the language format.

However, if no most recent state with a match is found, the language format is determined to be non-deterministic. In such a case, no current or previous state resulted in a matching language format.

Figure 6:
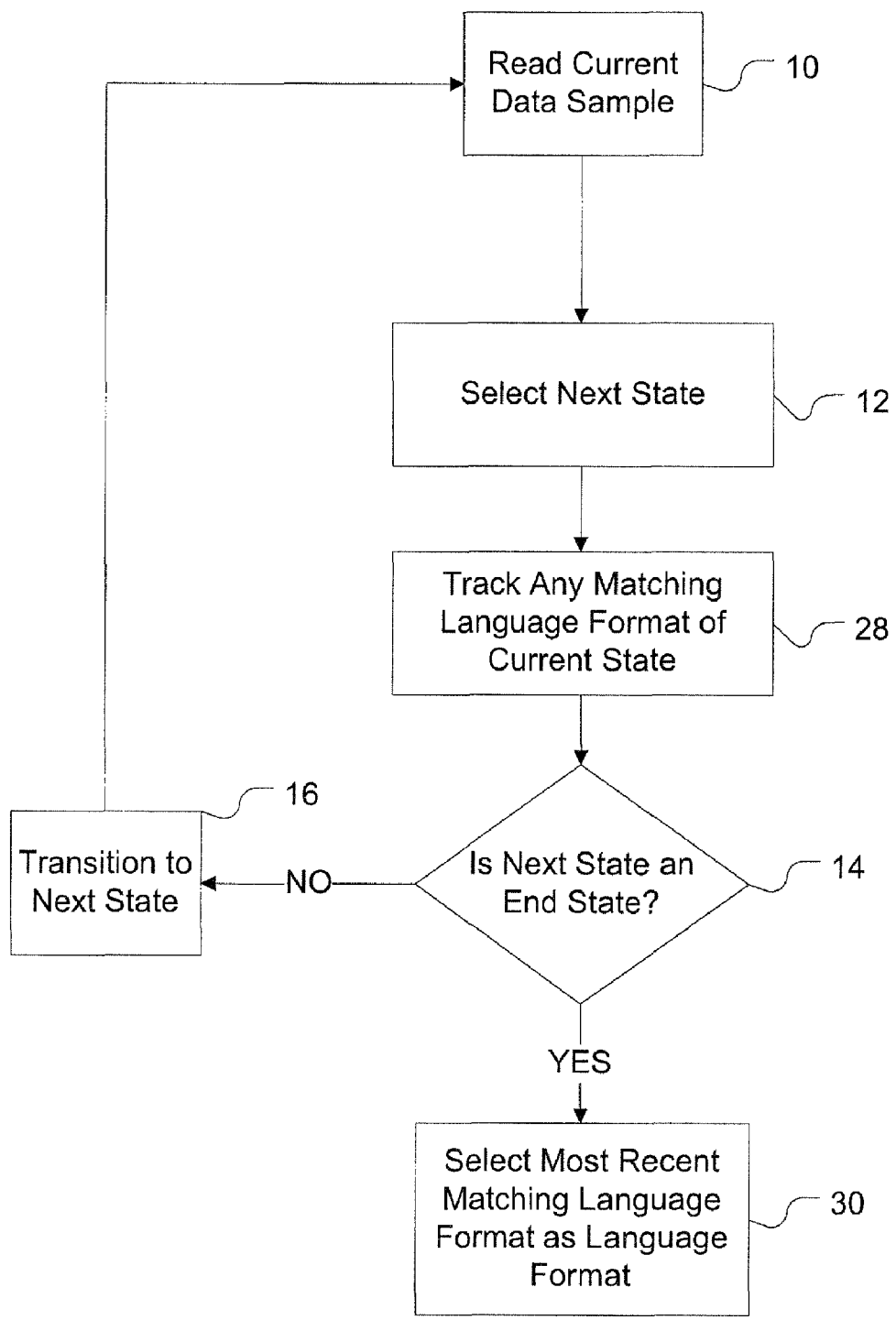
FIG. 6 is flowchart showing how matching language formats are tracked according to another embodiment.

FIG. 6 is flowchart showing how matching language formats are tracked according to another embodiment. In 28, any matching language format of the current state is tracked. Thus, when the next state is an end state in 14, the most recent matching language format may be selected in 30. Such a selection in 30 may be made without interrogating previous states as described above.

The tracking of matching language formats may be performed in a variety of ways. For example, any matched language format may be placed on a stack. Thus, if multiple matching language formats are found, the most recently placed matching language format on the stack may be selected as the matching language format.

Alternatively, a matched language format pointer may be modified when a state having a matching language format is reached. The pointer may be initialized to indicate a non-deterministic match. Then, each time a state includes a matching language format, the pointer is updated. After reaching an end state, the pointer indicates the matching language format. If no matching language formats were found, then the pointer indicates that the language format is non-deterministic. Any such technique for tracking a matching language format may be used in 28

Referring to FIG. 4, after a language format is determined, a callback associated with the language format may be executed in 32. Within a particular language format, there may be language format specific data. Such data may include indications of the language format version, encodings used within the data stream, or other format specific data. Such encodings may include encryption formats, compression formats, or other encodings of the data. This information may be made available to any process requesting such information. A callback function specific to the language format may be executed in 32 to read and interpret such language format specific data. To enable the execution of such a callback function in 32, a pointer to the callback function may be returned by the language determination process.

After a language format is identified in 18, the input data stream may be rendered in 19 as desired. With knowledge of the language format, the data may be rendered according to the language format. Rendering may be any presentation of the data. For example, printing of the data may be rendering. In addition, converting the data into another format may be rendering. Such conversion may include adding additional data such as processing commands or device specific commands suitable for a target imaging device. For example a device implementing an embodiment described above may be a front end for a legacy imaging device incapable of rendering prevailing image formats. The device may process the input data stream into a format acceptable by the legacy imaging device and include appropriate commands to control the legacy device.

As described above, data samples are read and compared with language signatures. However, if no more data samples are available, even though the state machine has not reached an end state, the state machine may indicate that the language is non-deterministic.

The data stream may include processing additional data within the input data stream. For example, the input data stream may have preceding data such as escape sequences, specific commands, or other metadata preceding the image data. Referring to FIG. 4, to aid in determining the language format, such preceding data may be isolated in 34 from the input data stream. Such preceding data may be isolated in 34 in a variety of ways.

Figure 7:
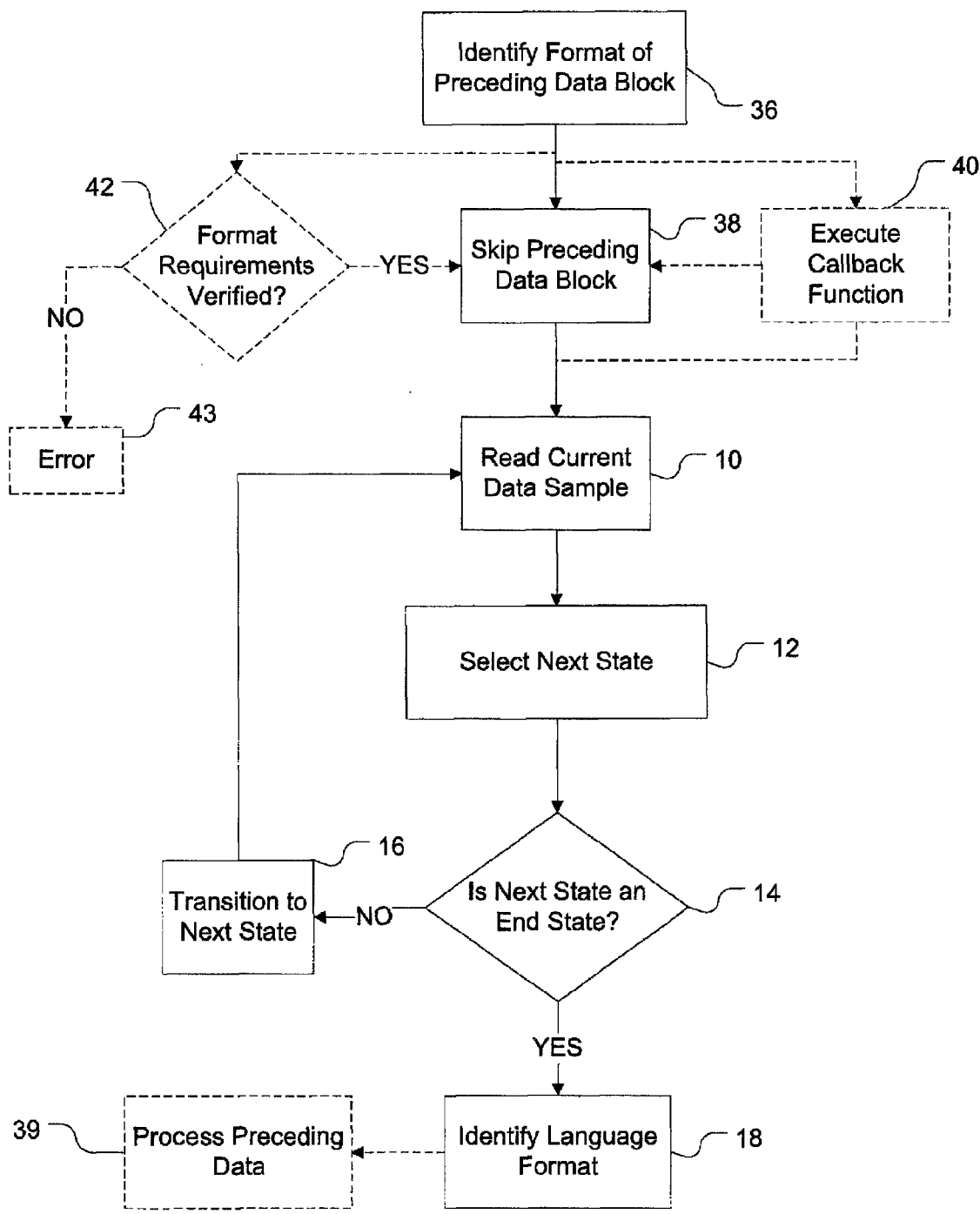
FIG. 7 is flowchart showing how preceding data blocks are identified and skipped according to another embodiment.

FIG. 7 is flowchart showing how preceding data blocks are identified and skipped according to another embodiment. In 36, the format of a preceding data block is identified. In 38, the preceding data block is skipped.

For example, tests may be performed for known formats of the preceding data. For example, a Universal Exit Language (UEL) sequence may include an escape character (such a hexadecimal value of 0x1B) followed by a particular byte sequence (such as %-12345X). The process may check the data sample for the escape character. If found, the process may read a byte sample of the expected additional bytes to confirm the UEL. If such a UEL is found, it may be recorded for later use. The UEL may be stripped from the data stream.

Some preceding data may have a variable length. In particular, markup language formats, such as the Extensible Markup Language (XML), include tags that delineate elements. For example, an opening "<body>" tag must be eventually followed by a closing "</body>" tag. However, the length of intervening data may not be determinable from the opening tag. By identifying the particular format in 36, data between the opening tag and the closing tag may be skipped in 38. In this example, any data before and including a closing "</body>" tag would be skipped.

Although XML has been used as an example, other formats may have varying data lengths between tags or other identifiers. Such formats may have corresponding terminators indicating the end of that particular data block. The identification of the format in 36 allows skipping the preceding data block by searching for the appropriate terminator associated with the format.

After such preceding data is isolated from the data stream, the state machine described above may proceed to identify the language format.

If at some point, there is a failure to recognize a format of expected preceding data, the flow may return any read bytes used in attempting to determine the format of the preceding data to the reading process. Thus, any data that was not recognized maybe subsequently used in other instances of a state machine, for example, a state machine to recognize the language format of the input data stream as described above.

Similar to determining the language format of the input data stream, a similar state machine may be used to process the preceding data. Similar to the language format, the identity or format of preceding data may not be known. By using such a state machine and comparing the read data samples to the signatures of the preceding data formats, the format of the preceding data may be discovered. Thus, the preceding data may be processed accordingly.

Regardless of the method used to isolate the preceding data, any preceding data may be indicated for later processing. Such indicating for later processing may include storing the preceding data, referencing the preceding data, setting a flag associated with the preceding data, or the like. For example, a PJL command may change the paper size for an associated print job. After the language format is recognized, the PJL command may be processed appropriately in 39. However, if the language format of the input data stream is not recognized, the PJL command need not be applied to the imaging device.

Referring to FIG. 7, a callback function associated with the identified format of a preceding data block may be executed in 40. As described above, the language formats may have associated callback functions. Similarly, the preceding data format may have an associated callback function. For example, as described above, if an XML tag is found, a callback may be executed to search for the corresponding closing tag. Thus, the callback function may be relied upon to return a location in the data stream beyond the XML data, such that the XML data is skipped. Thus, the execution of the callback function in 40 may be a replacement for skipping the preceding data in 38. In addition, the callback function may process the associated preceding data appropriately.

As described above, identifying the preceding data may be performed using a state machine described above in reference to the language formats. In addition, the same state machine may be used for both processing the preceding data and identifying the language format. For example, both the language format of data within the input data stream and the preceding data may have identifiable signatures. Thus, the state machine analyzes the input data stream until a matching signature is found.

Once a signature is found, the appropriate callback function may be executed. Such callback functions would appropriately process the data. For example, a callback for a block of preceding data including setup commands for an imaging device may issue the commands to the imaging device. A callback for an identified language format may render the data to the imaging device appropriately. Thus, each block of data, regardless of type or format, would be processed appropriately after matching the signature. After processing, the callback function may return processing to the state machine with a current position of the input data stream after the preceding data block.

Another embodiment includes verifying requirements associated with the preceding data block in 42 and indicating an error if the requirements are not satisfied in 43. Some formats of preceding data have prerequisites or requirements. For example, a PJL command should be preceded by a UEL byte sequence. If the UEL byte sequence does not appear in the data stream, then a requirement of the PJL command is not verified in 42. Thus, in 43, an error is indicated.

Figure 8:
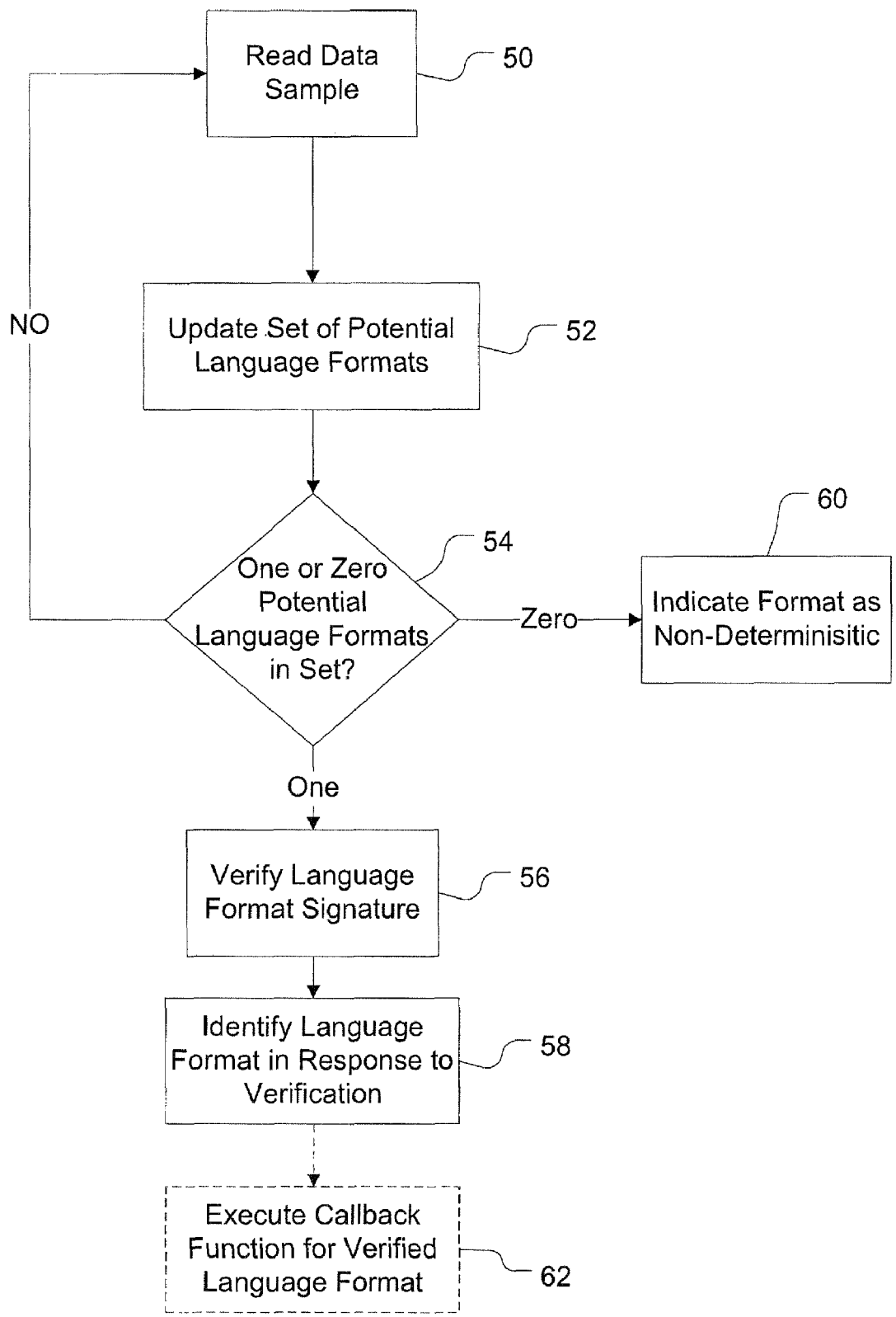
FIG. 8 is flowchart showing how a language format is recognized according to another embodiment.

FIG. 8 is flowchart showing how a language format is recognized according to another embodiment. In 50, a data sample of the input stream is read. In 52, a set of potential language formats is updated in response to the data sample. In 54, it is determined whether one or zero potential language formats remain in the set. If there are more than one potential language formats in the set, another data sample is read in 50 to narrow down the remaining potential language formats. Thus, in response to the data samples, the set of potential language formats is reduced to one or zero.

If zero language formats remain in the set, all potential language formats were removed from the set. Thus, the format is indicated as non-deterministic in 60. If one language format remains, the language format signature of that language format is verified in 56. Although the set of potential language formats is reduced to one, the preceding data samples may not completely match the language format signature of the remaining language format. The verification in 56 checks any additional data samples needed to verify the language format signature of the remaining language format.

Figure 9:
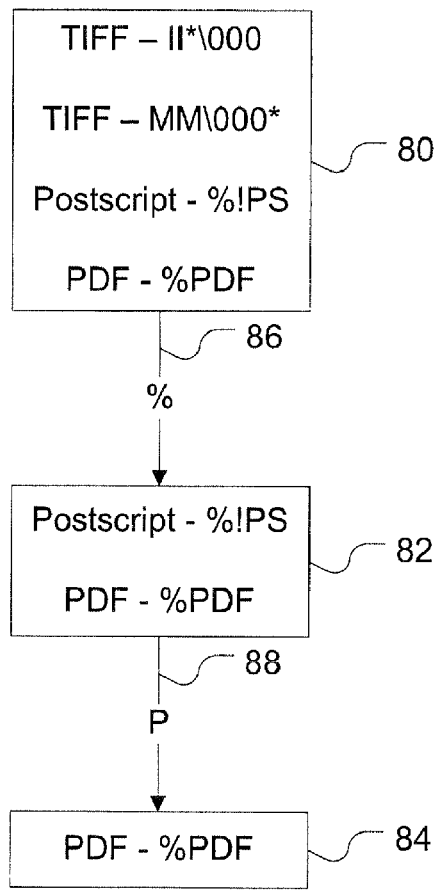
FIG. 9 is an example illustrating how a set of potential language formats is changed.

FIG. 9 is an example illustrating how a set of potential language formats is changed. Referring to FIG. 8 and FIG. 9, the initial set 80 indicates four potential language formats. An initial set 80 may, but need not include all potential language formats available. Furthermore, the initial set 80 need not be fixed. For example, subsequent updates or revisions may be made to the set to add or remove language formats to and from the initial set 80.

In this example, the first data sample that is read is a "%" byte. Thus, the arrow 86 illustrates the updating of the initial set 80 in 52 into an updated set 82. Since there are two remaining potential language formats in the set, the set is updated again in 52 in response to a data sample of "P", illustrated by arrow 88.

In the updated set 84, there is only one remaining potential language format in the set, "PDF". However, since only the language signature fragment "% P" has been matched, the remaining language signature fragment "DF" must be matched to verify the language format signature in 56. The language format may be identified in response to the verification in 58.

In another example, as described above, a first language format signature may be wholly contained within a second language format signature. Thus, the set may be updated until two potential language formats remain in the set: the first language format that was matched, and the second language format that has remaining unverified signature fragments.

Updating the set in 52 may include removing a matched language format from the set if a subsequent matching language format is found. Thus, in this example, if subsequent data samples indicate a match with the second language format signature, the first language format, which was matched, is removed from the set. Thus, only one language format remains in the set to be verified in 56 and identified in 58. Alternatively, if the second language format signature is not found, then the second language format is removed from the set, leaving the first language format in the set to be verified in 56 and identified in 58.

As described above, once a language format is identified, an associated callback function may be executed. In an embodiment illustrated in FIG. 8, a matching language format may be identified in 58. Then the associated callback function may be executed in 62.

Reading the next data sample may include reading the next data sample in sequence. For example, bytes may be read in sequence. Referring to FIG. 9, first a byte representing a "%" is read, followed by a byte representing a "P". By reading data samples in sequence and updating the set of potential language formats accordingly, a particular byte of the data stream need only be read once in order to determine a language format.

Figure 10:
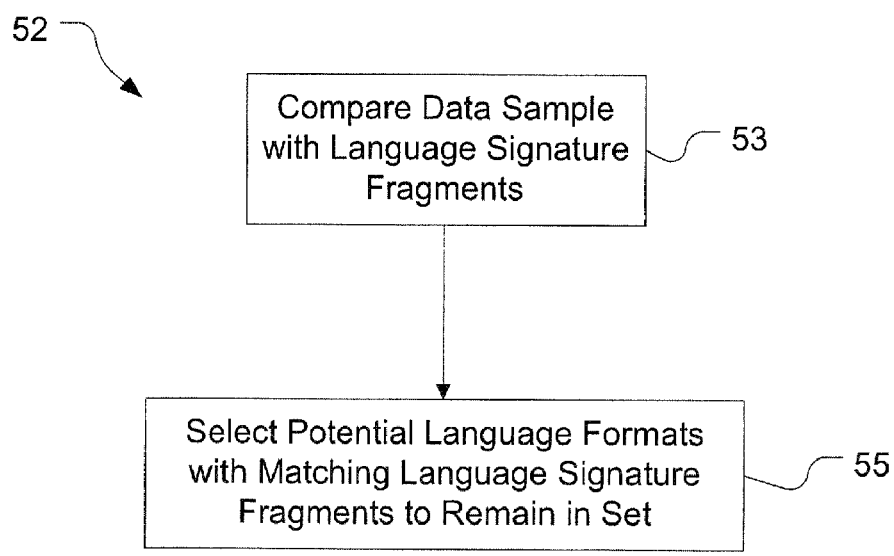
FIG. 10 is flowchart showing how a set of potential language formats is updated in FIG. 8.

FIG. 10 is flowchart showing how a set of potential language formats is updated in FIG. 8. In 53, the data sample is compared with corresponding language signature fragments. Potential language formats with matching signature fragments are selected in 55 to remain in the set.

The comparison may, but need not be a comparison between the data sample and every corresponding language signature fragments. For example, only one comparison may be made with a language fragment that is common to multiple potential language formats in the set. As described above, both PS and PDF formats included a "%" character as a first language fragment. One comparison is made between the language signature fragment "%" and the data sample to determine if both PS and PDF should remain as potential language formats. Thus, from the comparison, potential language formats including language signature fragments matching the data sample are selected to remain in the set in 55 during the updating in 52.

Furthermore, any of the above-mentioned methods may be implemented through an article of machine-readable code, embodied in a machine-readable medium that, when executed in the machine, causes the machine to perform the method. A machine may be any device or system capable of executing code, such as general purpose computers, application specific integrated circuits, programmable logic devices, digital signal processors, or the like. For example, the computer device 110 of FIG. 1 may be controlled through firmware, code, or other data 105 stored in the memory 116. Although the code and data 105 has been illustrated in FIG. 1 as being stored in the memory 116, the code and data 105 may be stored in other storage devices such as the mass storage devices 126, other computer devices 136 attached through the network 138, or the like.

Embodiments embrace one or more computer readable media. Each medium may include or may be configured to include the machine-readable code including data structures, objects, programs, routines, or other program modules that may be accessed by a processing system, such as one associated with a general-purpose computer capable of performing various different functions or one associated with a special-purpose computer capable of performing a limited number of functions. The machine-readable code may cause the processing system to perform a particular function or group of functions.

Furthermore, examples of computer readable media include random-access memory ("RAM"), non-volatile random access memory ("NVRAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), removable storage (e.g., USB thumb-drive), or any other device or component that is capable of providing data or executable instructions that may be accessed by a processing system.

In addition, the machine-readable code may include code for a variety of processors or other computing devices that may execute code. Thus, the machine-readable code may include, for example, code such as processor specific code and programmable logic device configuration data. Thus, a device may be manufactured that has the capability of identifying language formats in input data streams as described above, but in which the capability is not implemented. However, through a subsequent update or retrofit, whether software, firmware, or other code, the functionality may be enabled in the device.

Additionally, the language format identifier may be implemented as a service external to the device. For example, the machine-readable code may be executed on a processor or system external to an imaging device. The identified language format may be communicated to the imaging device from the external system.

Another embodiment includes an apparatus for identifying a language format. The above described methods may be implemented in an apparatus such as the computer device 110 described above. Furthermore, the computer device 110 may be a general-purpose or a special-purpose computer, or a combination of such computers. For example, computer device 110 may be a printer, a multi-functional peripheral ("MFP"), a scanner, a facsimile device, an electronic whiteboard, a display monitor, a tablet PC, a document server, general purpose computer, special purpose computer, a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Embodiments described above may be used for any process that can perform an operation on a variety of input formats. For example, such embodiments may be used in faxing, scanning, copying, filing, conversion, publishing, or the like.

While embodiments have been described with reference to identifying a language format for the purpose of interpreting the data, it may be used for any purpose, such as a preprocessing phase prior to interpretation. For example, a preprocessing phase may add a border, logo, banner, or any other additional data. By identifying the language format, the additional data may be added in the same format.

Although particular processes have been described as parts of particular embodiments of methods, such processes may be combined with other embodiments as desired.

Although particular embodiments have been described, it will be appreciated that the principles of the invention are not limited to those embodiments. Variations and modifications may be made without departing from the principles of the invention as set forth in the following claims.

The invention claimed is:

1. A method of recognizing a language format of an input data stream, comprising:
receiving the input data stream in an imaging device;
reading a next data sample of the input data stream in a current state, wherein a size of the next data sample is selected in response to at least one of the current state and a next state;
selecting the next state in response to the next data sample, comprising:
comparing the next data sample with a list of data sample values associated with the current state, each state being associated with only a single list of data sample values and each data sample value of the list associated with a different language signature; and
selecting the next state in response to a match between the next data sample and one of the data sample values in the list;
transitioning to the next state and repeatedly reading the next data sample and selecting the next state until the next state is an end state;
identifying the language format in response to the current state when the next state is an end state; and
rendering a remainder of the input data stream according to the identified language format with the imaging device.

2. The method of claim 1, wherein identifying the language format in response to the current state comprises:
determining a most recent state from among the current state and previous states that includes a matching language format;
selecting the matching language format from the most recent state as the language format; and
indicating that the language format is non-deterministic when no most recent state is found.

3. The method of claim 1, further comprising:
tracking a matching language format when the current state includes the matching language format; and
selecting a most recent tracked matching language format as the language format.

4. The method of claim 1, further comprising:
executing a callback function for the identified language format.

5. The method of claim 1, further comprising:
isolating preceding data from the input data stream.

6. The method of claim 5, further comprising:
identifying a format of a preceding data block; and
skipping the preceding data block in response to the identified format of the preceding data block.

7. The method of claim 6, further comprising:
executing a callback function associated with the identified format of the preceding data block.

8. The method of claim 6, further comprising:
verifying a presence of data blocks in the input data stream required for processing the preceding data block; and
indicating an error if the data blocks are not present.

9. The method of claim 1, further comprising:
identifying a matching language format as the language format when the current state indicates the matching language format.

10. The method of claim 1, wherein the next data sample has a fixed size.

11. The method of claim 10, wherein the fixed size is one byte.

* * * * *